2,774,757

PROCESS FOR THE PRODUCTION OF
THIOACYLHYDRAZONES

Engelbert Kühle and Richard Wegler, Leverkusen, Germany, assignors to Farbenfabriken Bayer Aktiengesellschaft, Leverkusen, Germany, a corporation of Germany No Drawing. Application July 26, 1955,
Serial No. 524,581

Claims priority, application Germany August 19, 1954

7 Claims. (Cl. 260—240)

The present invention relates to a process of producing thioacylated hydrazones of heterocyclic aldehydes. Such hydrazones can be prepared by the conventional process of condensing thioacylhydrazides with heterocyclic aldehydes. This process, however, is commercially unsatisfactory, since the thioacylhydrazides are difficult to prepare. Moreover, the heterocyclic aldehydes are unstable and dfficult to manipulate.

It is therefore the object of the present invention to provide a process of producing thioacylhydrazones which avoids the use of these starting materials.

A further object is a process which renders it possible to obtain thioacylhydrazides in good yields from simple starting compounds which are readily available.

Further objects will become apparent as the following specification proceeds.

We have found that thioacylated hydrazones of heterocyclic aldehydes can be obtained by heating together a mixture of sulfur, a heterocyclic compound containing a reactive methyl group and an aromatic or heterocyclic carboxylic acid hydrazide.

Heterocyclic compounds having reactive methyl groups, which can be used in the process of the invention are for instance 2- and 4-methyl-pyridine, quinaldine, 2-methylbenzothiazole, 2 - methylthiophene, 2.4 - dimethylpyridine, 2,5 - dimethpyridine. In the case of the latter two compounds only the methyl group in the 2-position takes part in the reaction.

Suitable aromatic carboxylic acid hydrazides are for instance benzoic acid hydrazide, the hydrazides of halogen substituted-, nitrosubstituted-, and alkyl-substituted benzoic acids, naphthoic acid hydrazide, diphenylcarboxylic acid hydrazide. Heterocyclic carboxylic acid hydrazides useful in the process of the invention are the pyridine carboxylic acid hydrazides, the quinoline carboxylic acid hydrazides, pyromucic acid hydrazide and thiophenecarboxylic acid hydrazide.

In general the reaction is carried out without the addition of a solvent of diluent. The mixture of the reaction components is heated to temperatures between 120–180° C. During the reaction hydrogen sulfide is evolved. The reaction components are preferably employed in a molar ratio of two molar proportions of sulfur, one molar proportion of the heterocyclic methyl compound and one molar proportion of the carboxylic acid hydrazide.

In the reaction the symmetrical diacyl hydrazines corresponding to the carboxylic acid hydrazides employed are formed as byproducts.

The products of the present invention are suitable as intermediates for the production of pharmaceuticals, dyestuffs and insecticides.

Example 1

46.5 grams (½ mol) of 4-methylpyridine, 68.5 grams (½ mol) of isonicotinic acid hydrazide and 32 grams (1 mol) of sulfur are heated for five hours on the oil bath to a temperature of 135–140° C. During the reaction hydrogen sulfide is evolved continuously. Towards the end of the period of reaction the temperature is raised to 150° C. About 70 milliliters of aceto nitrile are added to the warm reaction mixture. The reaction mixture is then cooled and the precipitate formed (83.5 grams) is sucked off. By evaporating the solvent another 3 grams of crystals are obtained and about 10 grams of unreacted 4-methyl pyridine. The precipitate is recrystallized from dimethyl formamide and 28 grams of pure pyridine-4-aldehyde thioisonicotinoyl hydrazone of the melting point 238° C. are recovered. A mixture of this compound with a comparative sample obtained by condensing thioisonicotinic acid hydrazide and pyridine-4-aldehyde does not show any depression of the melting point.

The dimethyl formamide solution contains 18 grams of the diisonicotinoyl hydrazine which can be recovered by the addition of ether and has a melting point of 264° C.

Example 2

46.5 grams of (½ mol) of 4-methyl pyridine, 68 grams (½ mol) of benzoic acid hydrazide and 32 grams (1 mol) of sulfur are heated for five hours to 135–140° C. 50 milliliters of aceto nitrile are added to the warm reaction mixture and the precipitate is sucked off after cooling. 79 grams of a solid product are obtained which consists of a mixture of N,N'-dibenzoyl hydrazine of the melting point 241° C. and the N-benzoyl thioisonicotinoyl hydrazone of pyridine-4-aldehyde of the melting point 184° C. The two compounds can be separated by fractionate crystallization from ethanol.

Example 3

11.9 grams of 4-methyl pyridine, 11.7 grams of nicotinoyl hydrazide and 5.5 grams of sulfur are stirred for five hours at 140° C. The reaction mixture is allowed to cool and the solid residue is recrystallized from ethanol. Finally the thionicotinoyl hydrazone of pyridine-4-aldehyde of the melting point 201° C. is obtained.

Example 4

75 grams (½ mol) of 2-methyl benzthiazole, 68 grams (½ mol) of benzoic acid hydrazide and 32 grams (1 mol) of sulfur are heated for two hours on the oil bath to a temperature of 160–170° C. The reaction mixture is allowed to cool, 150 milliliters of aceto nitrile are added thereto and the precipitate is sucked off. 86 grams of a solid product are obtained. From the filtrate about 15 grams of unreacted 2-methylbenzthiazole can be recovered by distillation. The solid precipitate is extracted with dimethyl formamide at 50–60° C. The insoluble component is recrystallized from boiling dimethyl formamide. About 7 grams of benzthiazole-2-thiocarbonyl hydrazone of benzthiazole-2-aldehyde of the melting point 246–248° C. are obtained. In the dimethylformamide solution there are found N,N'-dibenzoylhydrazine of the melting point 241° C. and a condensation product of uncertain structure having the melting point 182° C. after recrystallizing from dioxane.

Example 5

75 grams (½ mol) of 2-methylbenzthiazole, 68.5 grams (½ mol) of isonicotinic acid hydrazide and 32 grams (1 mol) of sulfur are heated for four hours on the oil bath to a temperature of 160° C. About 100 milliliters of dimethyl formamide are added to the warm reaction mixture and the precipitate is sucked off after cooling. It consists of crude benzthiazole-2-aldehyde-thioisonicotinoyl hydrazone, which melts at 280–283° C. after recrystallizing from dimethyl formamide.

Example 6

71.5 grams (½ mol) of quinaldine, 68.5 grams (½ mol) of isonicotinic acid hydrazide and 32 grams of sulfur are heated on the oil bath to 150–160° C. for four hours. 100 milliliters of aceto nitrile are added to the hot reaction mixture and the precipitate sucked off after cooling. About 65 grams of quinoline-2-aldehyde thio-isonicotinoyl hydrazone are obtained which melts at 237° C. after recrystallizing from dimethyl formamide.

Example 7

36 grams of quinaldine, 42.5 grams of 4-chloro benzoic acid hydrazide and 16 grams of sulfur are heated on the oil bath to 160–170° C. for two hours. The reaction mixture is diluted with 50 milliliters of aceto nitrile and the residue sucked off after cooling. By recrystallizing the residue from dimethyl formamide 15 grams of quinoline-2-aldehyde-4-chlorophenyl-thiocarbonyl hydrazone of the melting point 254–255° C. are obtained.

We claim:

1. The process of producing thioacylhydrazones which comprises heating to temperatures of between about 120 to about 180° C. a mixture of sulfur and a heterocyclic compound containing a reactive methyl group said compound being selected from the group consisting of 2- and 4-methylpyridine, quinaldine, 2-methylbenzothiazole, 2-methylthiophene, 2.4 - dimethylpyridine, 2.5 - dimethylpyridine, and an organic carboxylic acid hydrazide selected from the class consisting of benzoic acid hydrazide, the hydrazides of halogen-substituted-, nitro-substituted- and alkyl-substituted benzoic acids, naphthoic acid hydrazide, diphenylcarboxylic acid hydrazide, the pyridine carboxylic acid hydrazides, the quinoline carboxylic acid hydrazides, pyromucic acid hydrazide and thiophenecarboxylic acid hydrazide, and recovering the thioacylhydrazones formed from the reaction mixture.

2. The process of producing thioacylhydrazones which comprises heating to temperatures of between about 120 to about 180° C. a mixture of about two molecular proportions of sulfur and about one molecular proportion of a heterocyclic compound containing a reactive methyl group said compound being selected from the group consisting of 2- and 4-methylpyridine, quinaldine, 2-methylbenzothiazole, 2-methylthiophene, 2.4-dimethylpyridine, 2,5-dimethylpyridine, and about one molecular proportion of an organic carboxylic acid hydrazide selected from the class consisting of benzoic acid hydrazide, the hydrazides of halogen-substituted-, nitro-substituted- and alkyl-substituted benzoic acids, naphthoic acid hydrazide, diphenylcarboxylic acid hydrazide, the pyridine carboxylic acid hydrazides, the quinoline carboxylic acid hydrazides, pyromucic acid hydrazide and thiophenecarboxylic acid hydrazide, and recovering the thioacylhydrazones formed from the reaction mixture.

3. The process as claimed in claim 2, in which said heterocyclic methyl compound is 4-methyl pyridine and said organic carboxylic acid hydrazide is isonicotinic acid hydrazide.

4. The process as claimed in claim 2, in which said heterocyclic methyl compound is 4-methyl pyridine and said organic carboxylic acid hydrazide is benzoic acid hydrazide.

5. The process as claimed in claim 2, in which said heterocyclic methyl compound is 4-methyl pyridine and said organic carboxylic acid hydrazide is nicotinic acid hydrazide.

6. The process as claimed in claim 2, in which said heterocyclic methyl compound is 2-methyl benzthiazole and said organic carboxylic acid hydrazide is isonicotinic acid hydrazide.

7. The process as claimed in claim 2, in which said heterocyclic methyl compound is quinaldine and said organic carboxylic acid hydrazide is isonicotinic acid hydrazide.

No references cited.